United States Patent
Kim et al.

(10) Patent No.: US 7,526,665 B2
(45) Date of Patent: Apr. 28, 2009

(54) ELECTRICALLY CONTROLLED SUSPENSION SYSTEM

(75) Inventors: Wan Il Kim, Gyeonggi-do (KR); Jeong Woo Lee, Gyeonggi-do (KR)

(73) Assignee: Mando Corporation, Seoul (KR)

( * ) Notice: Subject to any disclaimer, the term of this patent is extended or adjusted under 35 U.S.C. 154(b) by 0 days.

(21) Appl. No.: 11/347,180

(22) Filed: Feb. 3, 2006

(65) Prior Publication Data

US 2006/0290078 A1 Dec. 28, 2006

(30) Foreign Application Priority Data

Jun. 13, 2005 (KR) .................. 10-2005-0050296

(51) Int. Cl.
*G06F 1/00* (2006.01)
*A01B 69/00* (2006.01)
(52) U.S. Cl. .................. 713/500; 713/400; 701/37; 701/41; 701/201
(58) Field of Classification Search .......... 713/400, 713/500; 701/37, 41, 201; 364/424.05
See application file for complete search history.

(56) References Cited

U.S. PATENT DOCUMENTS

| | | | | |
|---|---|---|---|---|
| 5,062,658 A | * | 11/1991 | Majeed | 280/5.503 |
| 5,483,448 A | * | 1/1996 | Liubakka et al. | 701/37 |
| 5,519,612 A | * | 5/1996 | Liubakka et al. | 701/37 |
| 5,570,288 A | * | 10/1996 | Badenoch et al. | 701/37 |
| 5,572,426 A | * | 11/1996 | Sasaki et al. | 701/37 |
| 5,987,369 A | * | 11/1999 | Kwak et al. | 701/37 |
| 6,859,702 B2 | * | 2/2005 | Kawashima et al. | 701/37 |
| 6,968,261 B2 | * | 11/2005 | Ghoneim et al. | 701/41 |
| 7,086,496 B2 | * | 8/2006 | Kodama | 180/446 |
| 2005/0085969 A1 | * | 4/2005 | Kim | 701/37 |
| 2005/0178628 A1 | * | 8/2005 | Uchino et al. | 188/379 |

* cited by examiner

*Primary Examiner*—Thomas Lee
*Assistant Examiner*—Vincent T Tran
(74) *Attorney, Agent, or Firm*—Seed IP Law Group PLLC

(57) ABSTRACT

An electronically controlled suspension system according to the present invention comprises a sensor unit for extracting and providing a vertical acceleration component of a vehicle body of a vehicle; a signal processing unit for calculating a vertical velocity of the vehicle body using the vertical acceleration component provided by the sensor unit; a control gain determining unit having a control gain set according to the amplitude of the vertical acceleration component, and detecting the amplitude of the vertical acceleration component provided by the sensor unit and extracting a control gain corresponding to the detected amplitude; a control command value calculating unit for calculating a control command value using the control gain provided by the control gain determining unit and the vertical velocity of the vehicle body provided by the signal processing unit; and a damper driving unit for driving the variable damper based in the control command value.

According to the present invention described above, a control command value for use in controlling a damping force of a damper is calculated using a nonlinear control gain according to a signal outputted from a speed or vertical acceleration sensor, thereby securing ride comfort and control stability.

4 Claims, 1 Drawing Sheet

<Fig. 1>
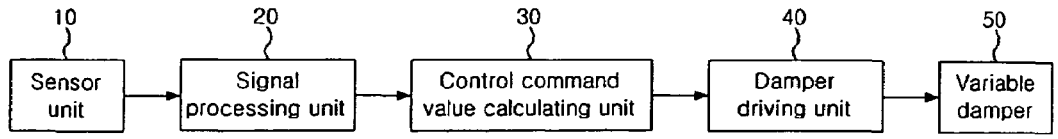
<Fig. 2>
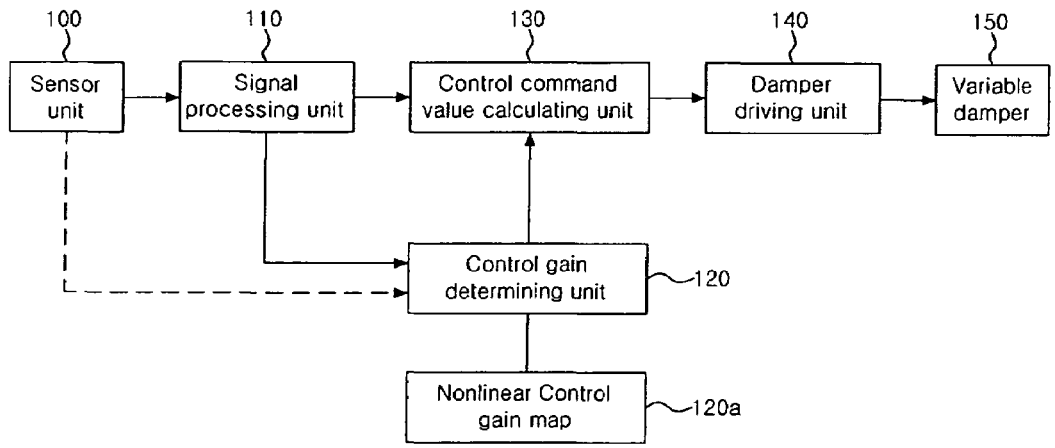
<Fig. 3>
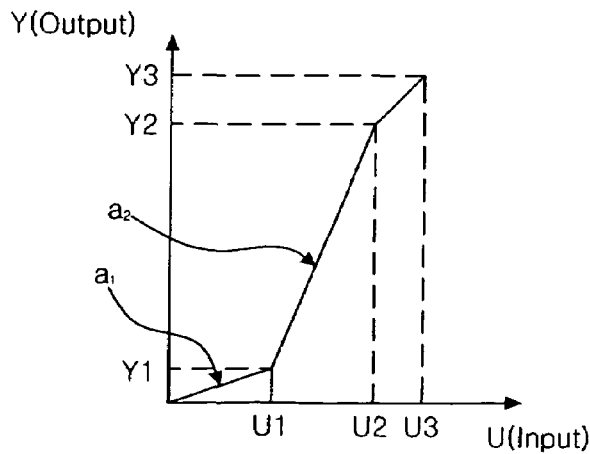

ELECTRICALLY CONTROLLED SUSPENSION SYSTEM

BACKGROUND OF THE INVENTION

1. Field of the Invention

The present invention relates to an electronically controlled suspension system, and more particularly, to an electronically controlled suspension system capable of securing ride comfort and control stability.

2. Description of the Related Art

Generally, a suspension system is a shock-absorbing apparatus comprising a shock absorber or spring installed between an axle and a frame of a vehicle, and serves to make the vertical movement of the vehicle smooth and to absorb a shock or vibration transmitted from a road surface so that the shock or vibration cannot be transmitted to a vehicle body of the vehicle.

Hereinafter, a conventional electronically controlled suspension system will be described with reference to the accompanying drawings. FIG. 1 is a block diagram illustrating a conventional electronically controlled suspension system.

As illustrated in FIG. 1, the electronically controlled suspension system comprises a sensor unit 10 for detecting and providing vertical acceleration components using vertical acceleration sensors mounted at portions of a vehicle body on the sides of front and rear road wheels of a vehicle; a signal processing unit 20 for detecting a velocity component from a signal outputted from the sensor unit 10; a control command value calculating unit 30 for calculating a control command value using a signal outputted from the signal processing unit 20 and a predetermined control gain K; and damper driving units 40 such as actuators for controlling damping forces of variable dampers 50 based on the control command value.

At this time, the damper driving unit 40 such as an actuator, e.g., a solenoid valve or a step motor, is connected to the variable damper 50. The variable damper 50 has two or more damping force characteristic curves such as hard and soft modes. At this time, the variable damper 50 changes a damping force continuously or at multiple stages in response to the driving of the damper driving unit 40. Here, the damper driving unit 40 drives the variable damper 50 based on the control command value from the control command value calculating unit 30. Accordingly, the variable damper 50 generates a damping force to suppress transmission of vibration from a road surface to the vehicle body, thereby improving ride comfort or preventing a variation in a ground contact force to enhance control stability of the vehicle.

The control command value to be outputted to the damper driving unit 40 for controlling the variable damper 50 is calculated by the control command value calculating unit 30. The control command value calculating unit 30 uses a predetermined constant value as the control gain K that is utilized in calculating such a control command value. If the control gain K used for the calculation of the control gain has been set to a large constant value and a high frequency signal representing an uneven road surface is inputted from the signal processing unit 20 to the control command value calculating unit 30, the control command value calculating unit 30 outputs a relatively large control command value in response to the large control gain K, and the damper driving unit 40 controls the variable damper 50 in hard mode according to the large control command value with respect to the uneven road surface for which soft mode control is required. Thus, there is a problem in that ride comfort is deteriorated.

On the other hand, if the control gain K has been set to a small constant value and a low frequency signal representing a wavy road surface is inputted from the signal processing unit 20 to the control command value calculating unit 30, the control command value calculating unit 30 outputs a relatively small control command value in response to the small control gain, and the damper driving unit 40 controls the variable damper 50 in soft mode according to the small control command value with respect to the wavy road surface for which hard mode control is required. Thus, there is a problem in that ride comfort is deteriorated.

BRIEF SUMMARY OF THE INVENTION

The present invention is conceived to solve the aforementioned problems in the prior art. Accordingly, an object of the present invention is to provide an electronically controlled suspension system, wherein a control command value for use in controlling a damping force of a damper is calculated by employing a nonlinear control gain according to a signal outputted from a vertical acceleration sensor, thereby securing ride comfort and control stability.

According to the present invention for achieving the object, there is provided an electronically controlled suspension system having a variable damper to be controlled using a control command value, comprising a sensor unit for extracting and providing a vertical acceleration component of a vehicle body of a vehicle; a signal processing unit for calculating a vertical velocity of the vehicle body using the vertical acceleration component provided by the sensor unit; a control gain determining unit having a control gain set according to the amplitude of the vertical acceleration component, and detecting the amplitude of the vertical acceleration component provided by the sensor unit and extracting a control gain corresponding to the detected amplitude; a control command value calculating unit for calculating a control command value using the control gain provided by the control gain determining unit and the vertical velocity of the vehicle body provided by the signal processing unit; and a damper driving unit for driving the variable damper based in the control command value.

BRIEF DESCRIPTION OF THE DRAWINGS

The above and other objects, features and advantages of the present invention will become apparent from the following description of a preferred embodiment given in conjunction with the accompanying drawings, in which:

FIG. 1 is a block diagram illustrating a conventional electronically controlled suspension system;

FIG. 2 is a block diagram illustrating an electronically controlled suspension system according to the present invention; and FIG. 3 is a view illustrating a nonlinear control gain map for use in calculating a control gain in the present invention.

DETAILED DESCRIPTION OF THE INVENTION

Hereinafter, a preferred embodiment of the present invention will be described in detail with reference to the accompanying drawings.

FIG. 2 is a block diagram illustrating an electronically controlled suspension system according to the present invention, and FIG. 3 is a view illustrating a nonlinear control gain map for use in calculating a control gain in the present invention.

Referring to FIG. 2, the electronically controlled suspension system according to the present invention comprises a sensor unit 100, a signal processing unit 110, a control gain determining unit 120, a control command value calculating unit 130, damper driving units 140, and variable dampers 150.

The sensor unit 100 detects vertical acceleration components of a vehicle using vertical acceleration sensors mounted at portions of a vehicle body on the sides of front and rear, right and left road wheels and provides them to the signal processing unit 110. The signal processing unit 110 calculates a vertical velocity of the vehicle body by integrating the vertical acceleration components and provides the velocity to the control gain determining unit 120 and the control command value calculating unit 130.

A nonlinear control gain map 120a, which is linear within each of intervals but nonlinear as a whole as shown in FIG. 3, is set in the control gain determining unit 120. The control gain determining unit 120 detects the amplitude of a signal representing the vertical velocity of the vehicle body, which is provided by the signal processing unit 110, and then extracts a control gain corresponding thereto based on the nonlinear control gain map 120a.

That is, if the amplitude of the signal representing the vertical velocity of the vehicle body is equal to or less than U1, the control gain determining unit 120 extracts a control gain a1 corresponding to the input U1 and provides it to the control command value calculating unit 130. If the amplitude of the signal representing the vertical velocity of the vehicle body is greater than U1 and equal to or less than U2, the control gain determining unit 120 extracts a control gain a2 from the nonlinear control gain map and provides it to the control command value calculating unit 130.

The control command value calculating unit 130 calculates a control command value using the control gain provided by the control gain determining unit 120 and the signal representing the vertical velocity of the vehicle body provided by the signal processing unit 110, and provides the control command value to the damper driving unit 140. As such, since the control command value calculating unit 130 calculates the control command value using the control gain, which is provided by the control gain determining unit 120 based on the signal inputted from the signal processing unit 110, rather than using a predetermined control gain, it is possible to calculate a control command value capable of accurately controlling the variable damper 150.

The damper driving unit 140 controls the variable damper 150 in soft or hard mode based on the control command value provided by the control command value calculating unit 130.

Although the description has been made by way of example in connection with a case where the control gain determining unit 120 uses the signal of the vertical velocity of the vehicle body upon determination of the control gain, the control gain determining unit 120 may determine a control gain while receiving a vertical acceleration component provided by the sensor unit 100. That is, the control gain determining unit 120 detects the amplitude of a vertical acceleration component, extracts a control gain corresponding thereto, and provides the control gain to the control command value calculating unit 130.

The electronically controlled suspension system according to the present invention determines a small control gain and calculates a control command value based on the small control gain if a high frequency signal representing an uneven road surface is inputted, whereas it determines a large control gain and calculates a control command value based on the large control gain if a low frequency signal representing a wavy road surface is inputted.

According to the present invention described above, a control command value for use in controlling a damping force of a damper is calculated using a nonlinear control gain according to a signal outputted from a speed or vertical acceleration sensor, thereby securing ride comfort and control stability.

The present invention is not limited to the embodiment described above, and it will be apparent that those skilled in the art can make various modifications and changes thereto within the technical spirit and scope of the present invention defined by the appended claims.

What is claimed is:

1. An electronically controlled suspension system having a variable damper to be controlled using a control command value, comprising:
   a sensor unit for extracting and providing a vertical acceleration component of a vehicle body of a vehicle;
   a signal processing unit for calculating a vertical velocity of the vehicle body using the vertical acceleration component provided by the sensor unit;
   a control gain determining unit having a control gain set according to the amplitude of the vertical acceleration component, and detecting the amplitude of the vertical acceleration component provided by the sensor unit and extracting a control gain corresponding to the detected amplitude from a nonlinear control map in which the control gain is set according to the amplitude of the vertical acceleration component, wherein the nonlinear control map comprises a plurality of linear relationships between the amplitude of the vertical acceleration component and the control gain, each of the plurality of linear relationships having a slope greater than zero;
   a control command value calculating unit for calculating a control command value using the control gain provided by the control gain determining unit and the vertical velocity of the vehicle body provided by the signal processing unit; and
   a damper driving unit for driving the variable damper based on the control command value.

2. The electronically controlled suspension system of claim 1, wherein the plurality of linear relationships includes a first linear relationship located between second and third linear relationships, the first linear relationship having a slope greater than slopes of the second and third linear relationships.

3. An electronically controlled suspension system having a variable damper to be controlled using a control command value, comprising:
   a sensor unit for extracting and providing a vertical acceleration component of a vehicle body of a vehicle;
   a signal processing unit for calculating a vertical velocity of the vehicle body using the vertical acceleration component provided by the sensor unit;
   a control gain determining unit having a control gain set according to the amplitude of the vertical velocity component of the vehicle body, and detecting the amplitude of the vertical velocity component provided by the signal processing unit and extracting a control gain corresponding to the detected amplitude from a nonlinear control map in which the control gain is set according to the amplitude of the vertical velocity component, wherein the nonlinear control map comprises a plurality of linear relationships between the amplitude of the vertical acceleration component and the control gain, each of the plurality of linear relationships having a slope greater than zero;

a control command value calculating unit for calculating a control command value using the control gain provided by the control gain determining unit and the vertical velocity of the vehicle body provided by the signal processing unit; and a damper driving unit for driving the variable damper based on the control command value.

4. The electronically controlled suspension system of claim 3, wherein the plurality of linear relationships includes a first linear relationship located between second and third linear relationships, the first linear relationship having a slope greater than slopes of the second and third linear relationships.

* * * * *